US012586025B2

(12) United States Patent
Seike et al.

(10) Patent No.: US 12,586,025 B2
(45) Date of Patent: Mar. 24, 2026

(54) OPERATION MANAGEMENT SYSTEM

(71) Applicant: ENEOS CORPORATION, Tokyo (JP)

(72) Inventors: Tadashi Seike, Tokyo (JP); Hideshi Iki, Tokyo (JP); Seiji Maeda, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 179 days.

(21) Appl. No.: 17/914,887

(22) PCT Filed: Mar. 26, 2021

(86) PCT No.: PCT/JP2021/013055
§ 371 (c)(1),
(2) Date: Sep. 27, 2022

(87) PCT Pub. No.: WO2021/200726
PCT Pub. Date: Oct. 7, 2021

(65) Prior Publication Data
US 2023/0126144 A1 Apr. 27, 2023

(30) Foreign Application Priority Data
Mar. 30, 2020 (JP) ................................. 2020-060410

(51) Int. Cl.
*G06Q 10/0832* (2023.01)
*C01B 3/26* (2006.01)

(52) U.S. Cl.
CPC ........... *G06Q 10/0832* (2013.01); *C01B 3/26* (2013.01); *C01B 2203/169* (2013.01)

(58) Field of Classification Search
CPC .. C01B 3/26; C01B 2203/169; G06Q 10/0832
See application file for complete search history.

(56) References Cited

U.S. PATENT DOCUMENTS

| | | | | |
|---|---|---|---|---|
| 7,676,404 | B2 * | 3/2010 | Richard | G06Q 10/087 705/28 |
| 10,586,993 | B2 * | 3/2020 | Cheng | C01B 3/26 |

(Continued)

FOREIGN PATENT DOCUMENTS

| | | |
|---|---|---|
| AU | 2012244083 | 11/2012 |
| CN | 105426995 | 3/2016 |

(Continued)

OTHER PUBLICATIONS

International Search Report issued in International Patent Application No. PCT/JP2021/013055, dated Jun. 15, 2021, along with an English translation thereof.

(Continued)

*Primary Examiner* — Dylan C White
(74) *Attorney, Agent, or Firm* — Greenblum & Bernstein, P.L.C.

(57) ABSTRACT

Provided is an operation management system configured to manage delivery of a raw material from a raw material production base where the raw material including a hydride is produced to a plurality of dehydrogenation bases where the raw material is subjected to a dehydrogenation reaction to obtain a hydrogen-containing gas. The operation management system includes: an information acquisition unit configured to acquire first information on a dehydrogenation status in the plurality of dehydrogenation bases; and a delivery plan creation unit configured to create a delivery plan for delivering the raw material to the plurality of dehydrogenation bases on the basis of the first information.

8 Claims, 7 Drawing Sheets

(56) References Cited

U.S. PATENT DOCUMENTS

| | | | |
|---|---|---|---|
| 2006/0015543 A1* | 1/2006 | Humphrey | G01F 15/061 |
| 2009/0165890 A1 | 7/2009 | Komura et al. | |
| 2016/0239793 A1 | 8/2016 | Wada et al. | |
| 2017/0166496 A1* | 6/2017 | Imagawa | C01B 3/26 |
| 2021/0405603 A1* | 12/2021 | Nagino | G06Q 30/0206 |
| 2022/0281422 A1* | 9/2022 | Jourdy | G06Q 50/06 |
| 2022/0315419 A1* | 10/2022 | Lin | B01J 21/066 |
| 2023/0356165 A1* | 11/2023 | Okada | B01J 35/635 |

FOREIGN PATENT DOCUMENTS

| | | |
|---|---|---|
| CN | 110334852 | 10/2019 |
| JP | 4-192074 | 7/1992 |
| JP | 2004-238180 | 8/2004 |
| JP | 2005-299497 | 10/2005 |
| JP | 2005-350299 | 12/2005 |
| JP | 2006-232607 | 9/2006 |
| JP | 2015-113240 | 6/2015 |
| JP | 2016-196367 | 11/2016 |
| JP | 2017-9069 | 1/2017 |
| JP | 2017-171521 | 9/2017 |
| JP | 2017-171522 | 9/2017 |
| JP | 2017-194745 | 10/2017 |
| JP | 2024077718 A * | 6/2024 |
| KR | 20140053510 | 5/2014 |
| WO | WO-2020203520 A1 * | 10/2020 .............. C01B 3/34 |

OTHER PUBLICATIONS

Written Opinion of the International Searching Authority issued in International Patent Application No. PCT/JP2021/013055, dated Jun. 15, 2021, alon with an English translation thereof.

International Preliminary Report on Patentability in International Patent Application No. PCT/JP2021/013055, dated Oct. 13, 2022, along with an Englisht ranslation thereof.

Extended European Search Report Issued in Corresponding EP Patent Application No. 21780462.4, dated Feb. 2, 2024.

Cai et al., "Progresses on liquid organic hydrides in hydrogen storage and transportation," Modern Chemical Industry (Nov. 2001), pp. 21-25, along with English Abstract.

* cited by examiner

OPERATION MANAGEMENT SYSTEM

TECHNICAL FIELD

The present disclosure relates to an operation management system.

BACKGROUND ART

In the related art, as a system that uses a raw material including a hydride from which a hydrogen-containing gas can be obtained by subjecting the raw material to a dehydrogenation reaction, for example, a system disclosed in Patent Literature 1 is known. A hydrogen supply system disclosed in Patent Literature 1 includes a tank that store a hydride of aromatic hydrocarbon as a raw material, a dehydrogenation reaction unit that subjects the raw material supplied from the tank to a dehydrogenation reaction to obtain hydrogen, a gas-liquid separation unit for gas-liquid separation of the hydrogen obtained in the dehydrogenation reaction unit, and a hydrogen purification unit that purifies the gas-liquid separated hydrogen.

CITATION LIST

Patent Literature

Patent Literature 1: Japanese Unexamined Patent Publication No. 2006-232607

SUMMARY OF INVENTION

Technical Problem

In a dehydrogenation base provided with the above-described system, a raw material that is delivered by a tank lorry or the like is used. In addition, the raw material is delivered from a raw material production base where the raw material is produced. Here, a raw material produced in one raw material production base may be delivered to a plurality of dehydrogenation bases. For example, in a case where the plurality of dehydrogenation bases exist over a wide range, when the raw material is not efficiently delivered to respective dehydrogenation bases, the frequency of delivery of a moving body such as the tank lorry increases. As a result, there is a problem that the delivery cost increases, and the cost of hydrogen finally increases.

The present disclosure has been made to solve the problem, and an object thereof is to provide an operation management system capable of efficiently delivering a raw material from a raw material production base to a plurality of dehydrogenation bases.

Solution to Problem

According to an aspect of the present disclosure, there is provided an operation management system configured to manage delivery of a raw material from a raw material production base where the raw material including a hydride is produced to a plurality of dehydrogenation bases where the raw material is subjected to a dehydrogenation reaction to obtain a hydrogen-containing gas. The operation management system includes: an information acquisition unit configured to acquire first information on a dehydrogenation status in the plurality of dehydrogenation bases; and a delivery plan creation unit configured to create a delivery plan for delivering the raw material to the plurality of dehydrogenation bases at least on the basis of the first information.

In the operation management system according to the present disclosure, the information acquisition unit acquires the first information on the dehydrogenation status in the plurality of dehydrogenation bases. The first information is information capable of grasping that each of the dehydrogenation bases is in which dehydrogenation status. Accordingly, it is possible to grasp that the raw material should be delivered to which dehydrogenation base at which timing. With respect to this, the delivery plan creation unit creates the delivery plan for delivering the raw material to the plurality of dehydrogenation bases at least on the basis of the first information. Accordingly, the delivery plan creation unit can create an appropriate delivery plan after collectively determining the dehydrogenation status of each of the dehydrogenation bases. As described above, it is possible to efficiently deliver the raw material from the raw material production base to the plurality of dehydrogenation bases.

The information acquisition unit may acquire second information on a production status of the raw material in the raw material production base, and the delivery plan creation unit may create the delivery plan on the basis of the first information and the second information. In this case, the delivery plan creation unit can create the delivery plan after also considering the production status of the raw material in the raw material production base.

The first information may include raw material information on the amount of the raw material used in the dehydrogenation bases, and dehydrogenation product information on the amount of a dehydrogenation product generated in accordance with the dehydrogenation reaction. In this case, the delivery plan creation unit can create the delivery plan after also considering the amount of the dehydrogenation product produced in each of the dehydrogenation bases.

The operation management system may further include a prediction unit configured to predict timing at which supply of the raw material to the dehydrogenation bases becomes necessary at least on the basis of the first information, and the delivery plan creation unit may create the delivery plan on the basis of a prediction result obtained by the prediction unit. In this case, the delivery plan creation unit can create the delivery plan in advance at a stage earlier than the timing at which supply of the raw material is actually necessary in the dehydrogenation bases on the prediction result obtained by the prediction unit.

The prediction unit may predict the timing at which supply of the raw material to the dehydrogenation bases becomes necessary on the basis of a demand for hydrogen in the dehydrogenation bases. In this case, the prediction unit can perform long-term prediction on the basis of a transition in a demand for hydrogen, or the like.

The prediction unit may predict the timing at which supply of the raw material to the dehydrogenation bases becomes necessary on the basis of a residual amount of the raw material in the dehydrogenation bases. In this case, the prediction unit can perform prediction based on an actual situation on the basis of an actual residual amount of the raw material in the dehydrogenation bases.

Advantageous Effects of Invention

According to the present disclosure, it is possible to provide an operation management system capable of efficiently delivering a raw material from the raw material production base to a plurality of dehydrogenation bases.

DESCRIPTION OF EMBODIMENTS

Figure 1:
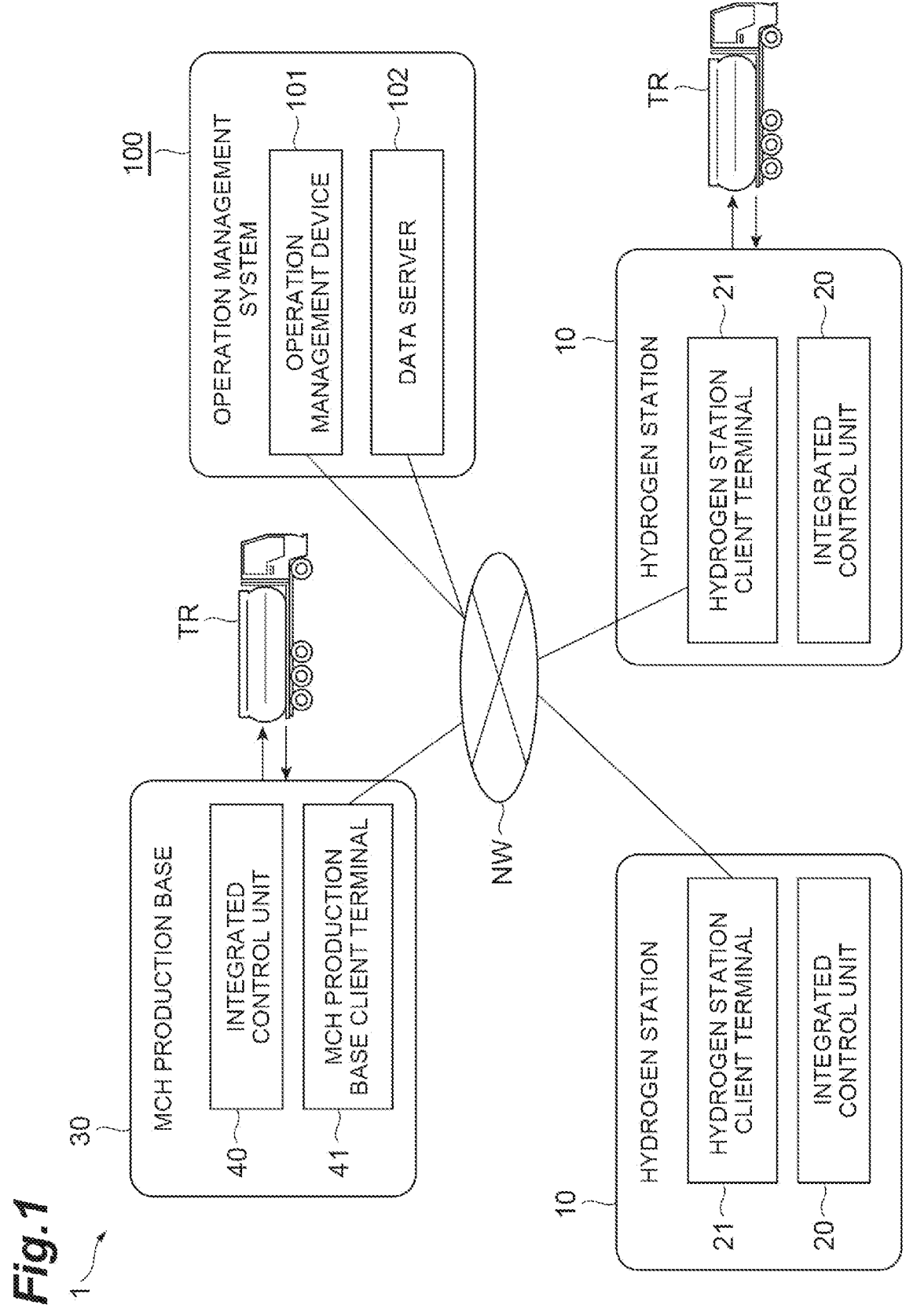
FIG. 1 is a schematic view of a hydrogen supply chain provided with an operation management system according to an embodiment of the present disclosure.

Hereinafter, an appropriate embodiment of an operation management system according to the present disclosure will be described with reference to the accompanying drawings. In the following description, the same reference numeral will be given to the same or equivalent portion, and redundant description will be omitted.

FIG. 1 is a schematic view of a hydrogen supply chain 1 provided with an operation management system 100 according to the embodiment of the present disclosure. The hydrogen supply chain 1 is a supply chain for delivering a raw material from a raw material production base where a raw material including a hydride is produced to a plurality of dehydrogenation bases where the raw material is subjected to a dehydrogenation reaction to obtain a hydrogen-containing gas. The delivery and raw material operation are managed by the operation management system 100. The hydrogen supply chain 1 includes a plurality of hydrogen stations 10 (dehydrogenation bases), an MCH production base 30 (raw material production base), and the operation management system 100. In addition, the plurality of hydrogen stations 10, the MCH production base 30, and the operation management system 100 are connected to each other by a network W. In the hydrogen supply chain 1, a moving body TR such as a tank lorry performs delivery of the raw material and recovery of a dehydrogenation product. Note that, in this embodiment, a since dehydrogenation device is provided within the hydrogen stations, the hydrogen stations are exemplified as the dehydrogenation bases. However, the dehydrogenation device may be provided adjacently to the hydrogen stations (that is, the dehydrogenation device may be provided separately from the hydrogen stations).

Each of the hydrogen stations 10 uses an organic compound (a liquid at an ordinary temperature) as a raw material. Note that, in a hydrogen purification process, a dehydrogenation product (organic compound (liquid at an ordinary temperature)) obtained by dehydrogenating the organic compound (liquid at an ordinary temperature) that is a raw material is removed. Examples of the organic compound that is a raw material include an organic hydride. An appropriate example of the organic hydride is a hydride obtained by causing hydrogen that is massively produced at an oil refinery and aromatic hydrocarbon to react with each other. In addition, the organic hydride is not limited to aromatic hydrogenated compound, and includes a 2-propanol system (hydrogen and acetone are produced). The organic hydride can be transported to the hydrogen station 10 by a moving body TR such as a tank lorry as a liquid fuel in a similar manner as in gasoline or the like. In this embodiment, as the organic hydride, methyl cyclohexane (hereinafter, referred to as "MCH") is used. In addition, as the organic hydride, a hydride of aromatic hydrocarbon such as cyclohexane, dimethyl cyclohexane, ethyl cyclohexane, decalin, methyl decalin, dimethyl decalin, and ethyl decalin is applicable. Note that, an aromatic compound is an appropriate example in which the amount of hydrogen contained is particularly large. The hydrogen station 10 can supply hydrogen to a fuel cell vehicle (FCV) or a hydrogen engine vehicle. Note that, application can also be made to a case of producing hydrogen from a natural gas containing methane as a main component, LPG containing propane as a main component, or liquid hydrocarbon raw materials such as gasoline, naphtha, kerosene, and light oil.

In this example, description will be made with reference to a case where MCH is employed as a raw material as described above, and a dehydrogenation product removed in a hydrogen purification process is toluene as an example. Note that, actually, not only toluene but also unreacted MCH, a small amount of by-products, and impurities exist, but in this embodiment, these are considered to be mixed with toluene and show the same behavior as in the toluene. Accordingly, in the following description, it is assumed that "toluene" is intended to include unreacted MCH and by-products.

Figure 2:
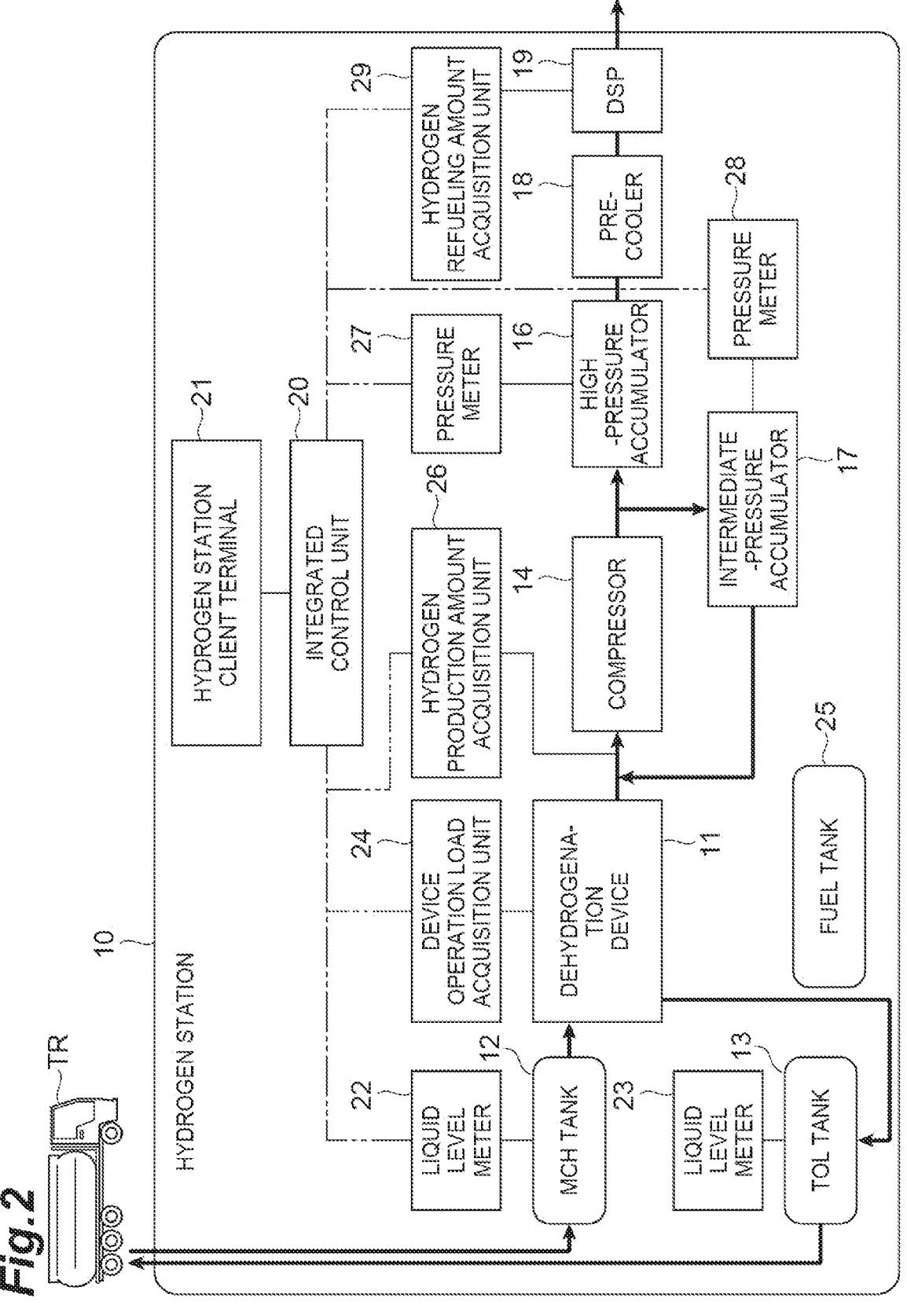
FIG. 2 is a block configuration diagram illustrating a block configuration of a hydrogen station.

A configuration of the hydrogen station 10 will be described in detail with reference to FIG. 2. FIG. 2 is a block configuration diagram illustrating a block configuration of the hydrogen station 10. As illustrated in FIG. 2, the hydrogen station 10 includes a dehydrogenation device 11, an MCH tank 12, a toluene tank 13, a compressor 14, a high-pressure accumulator 16, an intermediate-pressure accumulator 17, a precooler 18, a hydrogen charging device 19, an integrated control unit 20, and a hydrogen station client terminal 21. Note that, the intermediate-pressure accumulator 17 may be omitted.

The dehydrogenation device 11 is a device that subjects the MCH supplied from the MCH tank 12 to a dehydrogenation reaction to obtain hydrogen. The dehydrogenation device 11 is a device that extracts hydrogen from the MCH by the dehydrogenation reaction using a dehydrogenation catalyst. The dehydrogenation catalyst is not particularly limited, and is selected, for example, from a platinum catalyst, a palladium catalyst, and a nickel catalyst. These catalysts may be carried on a carrier such as alumina, silica, and titania. A reaction of the organic hydride is a reversible reaction, and a direction of the reaction varies in response to a reaction condition (a temperature or a pressure) (restricted by chemical equilibrium). On the other hand, the dehydrogenation reaction is always an endothermic reaction in which the number of molecules increases. Accordingly, conditions of a high temperature and a low pressure are advantageous. Since the dehydrogenation reaction is the endothermic reaction, the dehydrogenation device 11 is heated by heat obtained by combusting a fuel stored in a fuel tank 25.

The dehydrogenation device 11 obtains high-purity hydrogen gas by subjecting a hydrogen-containing gas obtained by the dehydrogenation reaction to gas-liquid processing and purification processing. Toluene separated from the hydrogen gas is recovered and stored in the toluene tank 13. The hydrogen gas produced by the dehydrogenation device 11 is pressure-conveyed by the compressor 14, and is accumulated by the high-pressure accumulator 16 and the intermediate-pressure accumulator 17. Note that, the hydrogen gas accumulated by the intermediate-pressure accumulator 17 is returned to the compressor 14. Note that, the MCH tank 12 is replenished with MCH from the moving body TR. In addition, toluene in the toluene tank 13 is recovered by the moving body TR.

The hydrogen charging device 19 is a device that charges the fuel cell vehicle (FCV) or the hydrogen engine vehicle with hydrogen. The hydrogen charging device 19 charges the vehicle with the hydrogen gas accumulated by the high-pressure accumulator 16 after cooling the hydrogen gas with the precooler 18.

The integrated control unit 20 is a device that controls the entirety of the hydrogen station 10, and acquires and integrates information representing various status inside the hydrogen station 10. In addition, the hydrogen station client terminal 21 is a terminal that is connected to the network NW (refer to FIG. 1) and performs communication with the outside to transmit and receive information.

The integrated control unit 20 acquires the amount of MCH inside the MCH tank 12 through a liquid level meter 22. The integrated control unit 20 acquires the amount of toluene inside the toluene tank 13 through a liquid level meter 23. The integrated control unit 20 acquires a device operation load (%) of the dehydrogenation device 11 through a device operation load acquisition unit 24. The integrated control unit 20 acquires the amount of hydrogen that circulates through a line between the dehydrogenation device 11 and the compressor 14, that is, the amount of hydrogen produced by the dehydrogenation device 11 through a hydrogen production amount acquisition unit 26. The integrated control unit 20 acquires the amount of accumulation by the high-pressure accumulator 16 and the intermediate-pressure accumulator 17 through pressure meters 27 and 28. The integrated control unit 20 acquires the amount of hydrogen charged by the hydrogen charging device 19 through a hydrogen refueling amount acquisition unit 29.

The integrated control unit 20 edits hydrogen station information (first information) on a dehydrogenation status in the hydrogen station 10 from the acquired information, and transmits the hydrogen station information on the network NW (refer to FIG. 1) through the hydrogen station client terminal 21. The hydrogen station information that is edited by the integrated control unit 20 includes residual amount data of MCH in the MCH tank 12, and MCH consumption data in the dehydrogenation device 11. As described above, the hydrogen station information includes MCH information (raw material information) on the amount of MCH that is used in the hydrogen station 10. In addition, the hydrogen station information includes residual amount data of toluene in the toluene tank 13, and toluene recovery amount data from the dehydrogenation device 11. As described above, the hydrogen station information includes at least toluene information (dehydrogenation product information) on the amount of toluene that is generated in accordance with a dehydrogenation reaction. In addition, the hydrogen station information also includes hydrogen supply amount data by the hydrogen charging device 19, and position information of the hydrogen station 10.

Figure 3:
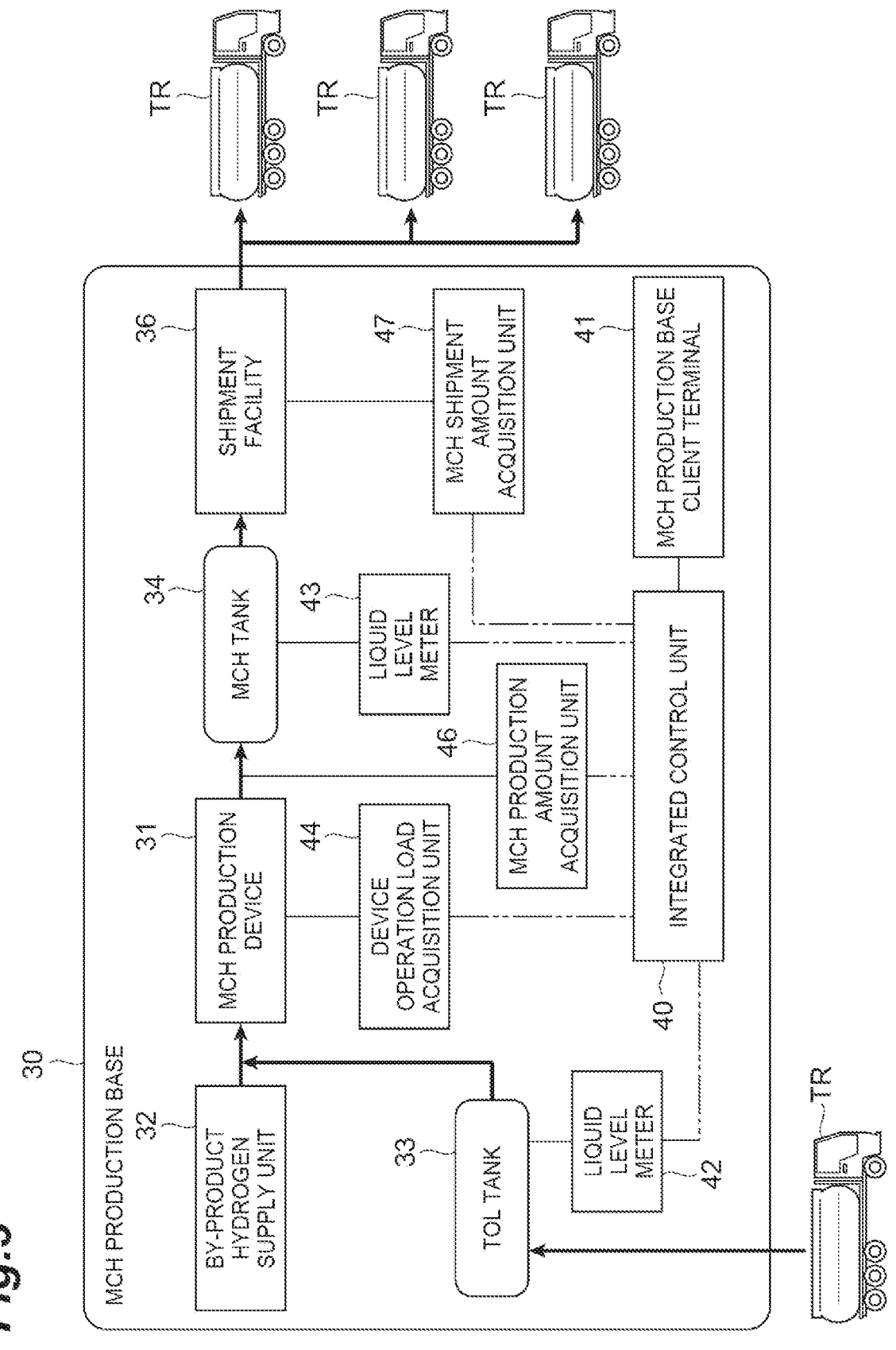
FIG. 3 is a block configuration diagram illustrating a block configuration of an MCH production base.

Next, a configuration of the MCH production base 30 will be described in detail with reference to FIG. 3. FIG. 3 is a block configuration diagram illustrating a block configuration of the MCH production base 30. As illustrated in FIG. 3, the MCH production base 30 includes an MCH production device 31, a by-product hydrogen supply unit 32, a toluene tank 33, an MCH tank 34, a shipment facility 36, an integrated control unit 40, and an MCH production base client terminal 41.

The MCH production device 31 is a device that produces MCH by subjecting toluene supplied from the toluene tank 33 and hydrogen supplied from the by-product hydrogen supply unit 32 to a catalytic reaction. Note that, the by-product hydrogen supply unit 32 supplies by-product hydrogen that occurs in a factory or the like. The MCH production device 31 supplies the produced MCH to the MCH tank 34 for storage. The shipment facility 36 ships the MCH stored in the MCH tank 34 to each of the hydrogen stations 10 through each moving body TR. Note that, the MCH production device 31 may produce MCH by using not only by-product hydrogen but also hydrogen produced by a water electrolysis device by using electric power with renewable energy.

The integrated control unit 40 is a device that performs control of the entirety of the MCH production base 30, and acquires and integrates information representing various statuses inside the MCH production base 30. In addition, the MCH production base client terminal 41 is a terminal that is connected to the network NW (refer to FIG. 1) and performs communication with the outside to transmit and receive information.

The integrated control unit 40 acquires the amount of toluene inside the toluene tank 33 through a liquid level meter 42. The integrated control unit 40 acquires the amount of MCH inside the MCH tank 34 through a liquid level meter 43. The integrated control unit 40 acquires a device operation load (%) of the MCH production device 31 through a device operation load acquisition unit 44. The integrated control unit 40 acquires the amount of MCH that circulates through a line between the MCH production device 31 and the MCH tank 34, that is, an MCH production amount of the MCH production device 31 through an MCH production amount acquisition unit 46. The integrated control unit 40 acquires the amount of MCH shipped by the shipment facility 36 through an MCH shipment amount acquisition unit 47.

The integrated control unit 40 edits MCH production base information (second information) on an MCH production status in the MCH production base 30 from the acquired information, and transmits the MCH production base information on the network NW (refer to FIG. 1) through the MCH production base client terminal 41. The MCH production base information edited by the integrated control unit 40 includes residual amount data of MCH in the MCH tank 34, residual amount data of toluene in the toluene tank 33, MCH shipment data by the shipment facility 36, toluene supply amount data from the toluene tank 33, toluene recovery amount data from the hydrogen station 10, and position information of the MCH production base 30.

In addition, the integrated control unit 40 receives a delivery plan and an MCH production plan from the operation management system 100 through the network NW and the MCH production base client terminal 41 (refer to FIG. 1). In addition, the integrated control unit 40 controls the MCH production device 31 on the basis of the MCH production device operation plan and controls the shipment facility 36 on the basis of the delivery plan. In addition, the integrated control unit 40 also gives an instruction to a worker by displaying the delivery plan and the MCH production plan on a monitor or the like inside the MCH production base 30.

Figure 4:
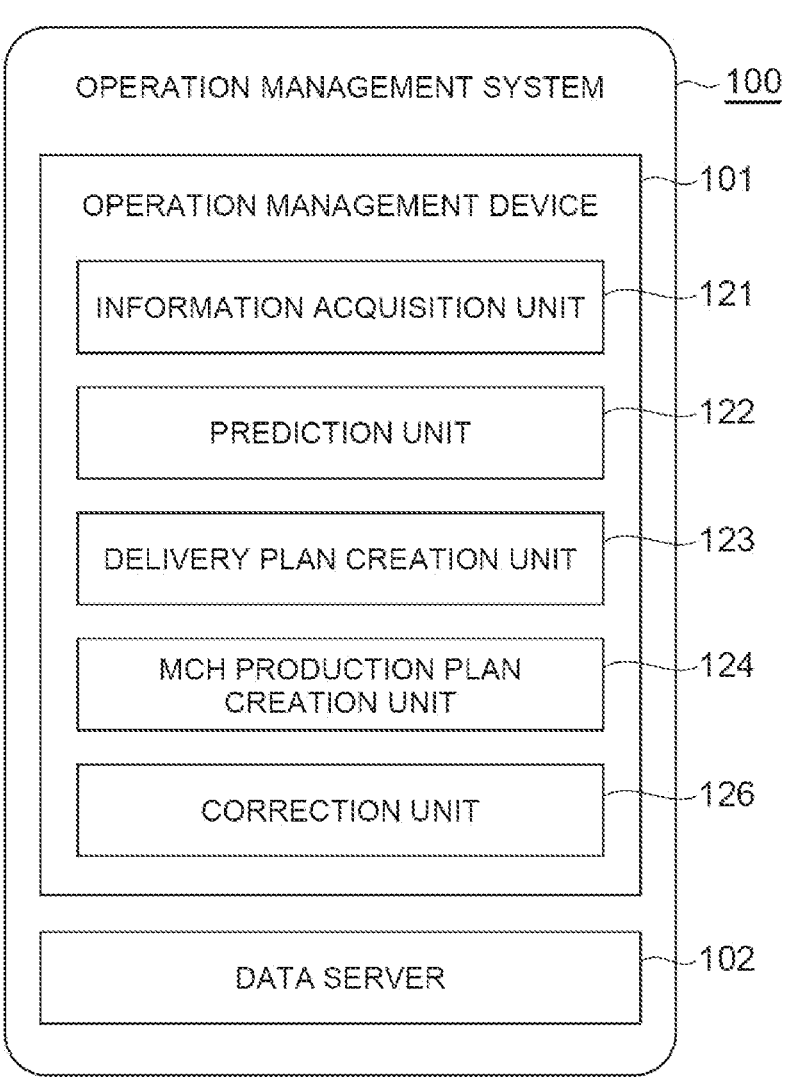
FIG. 4 is a block configuration diagram illustrating a block configuration of the operation management system.

Next, a detailed configuration of the operation management system 100 will be described with reference to FIG. 4. FIG. 4 is a block configuration diagram illustrating a block configuration of the operation management system 100. As illustrated in FIG. 4, the operation management system 100 includes an operation management device 101 and a data server 102. The data server 102 is a server that acquires and stores various pieces of information of the hydrogen supply chain 1 through the network NW (refer to FIG. 1). The data server 102 stores the hydrogen station information transmitted from the plurality of hydrogen stations 10, and stores the MCH production base information transmitted from the MCH production base 30. In addition, the data server 102 transmits the information to the operation management device 101 through the network NW (refer to FIG. 1).

The operation management device 101 is a device that manages delivery of MCH from the MCH production base 30 to the plurality of hydrogen stations 10, and manages operation of MCH in the entirety of the hydrogen supply chain 1. The operation management device 101 includes an information acquisition unit 121, a prediction unit 122, a delivery plan creation unit 123, an MCH production plan creation unit 124, and a correction unit 126.

The information acquisition unit 121 acquires hydrogen station information on a dehydrogenation status in the plurality of hydrogen stations 10. In addition, the information acquisition unit 121 acquires MCH production base information on an MCH production status in the MCH production base 30. The information acquisition unit 121 acquires the hydrogen station information in the plurality of hydrogen stations 10 and the MCH production base information in the MCH production base 30 from the data server 102 through the network NW.

The prediction unit 122 predicts timing at which supply of MCH to each of the hydrogen stations 10 becomes necessary on the basis of the hydrogen station information and the MCH production base information. In addition, the prediction unit 122 predicts timing at which toluene is recovered from the hydrogen station 10 on the basis of the hydrogen station information and the MCH production base information. The prediction unit 122 may predict timing at which supply of MCH to the hydrogen station 10 becomes necessary and timing at which recovery of toluene becomes necessary on the basis of a demand for hydrogen in the hydrogen station 10. In addition, the prediction unit 122 may predict timing at which supply of MCH to the hydrogen station 10 becomes necessary on the basis of a residual amount of MCH in the hydrogen station 10. In addition, the prediction unit 122 may predict timing at which recovery of toluene from the hydrogen station 10 becomes necessary on the basis of a residual amount of toluene (the amount of toluene stored in a tank) in the hydrogen station 10. A detailed prediction method in the prediction unit 122 will be described later.

The delivery plan creation unit 123 creates a delivery plan for delivering MCH to the plurality of hydrogen stations 10 on the basis of the hydrogen station information and the MCH production base information. The delivery plan also includes a plan for recovering toluene from the plurality of hydrogen stations 10. The delivery plan creation unit 123 creates the delivery plan on the basis of a prediction result in the prediction unit 122 which is based on the hydrogen station information and the MCH production base information. The delivery plan includes information such things as MCH is to be delivered to which hydrogen station 10 and at which timing, and toluene is to be recovered from which hydrogen station 10 and at which timing. The delivery plan creation unit 123 creates the delivery plan in consideration of the number of the moving body TR to be used for delivery, a distance up to each of the hydrogen stations 10 (that is, time necessary for delivery), and the like. The delivery plan creation unit 123 transmits the created delivery plan to the MCH production base 30 through the network NW. According to this, in the MCH production base 30, distribution of MCH by the moving body TR is performed on the basis of the delivery plan.

The MCH production plan creation unit 124 creates an MCH production plan in the MCH production base 30. The MCH production plan creation unit 124 creates the MCH production plan on the basis of the hydrogen station information, the MCH production base information, and the delivery plan. The MCH production plan creation unit 124 creates the MCH production plan by considering that a certain amount of MCH is to be delivered at which timing. The MCH production plan creation unit 124 transmits the created MCH production plan to the MCH production base 30 through the network NW. According to this, in the MCH production base 30, production of MCH is performed on the basis of the MCH production plan.

The correction unit 126 corrects the delivery plan and the MCH production plan in consideration of an actual operation situation in the plurality of hydrogen stations 10. For example, the correction unit 126 corrects the delivery plan and the MCH production plan in a case where an actual residual amount of MCH in the MCH tank 12 in an arbitrary hydrogen station 10, or an actual residual amount of toluene in the toluene tank 13 is different from prediction, or the like. The correction unit 126 transmits the delivery plan and the MCH production plan which are corrected to the MCH production base 30 through the network NW.

Figure 5:
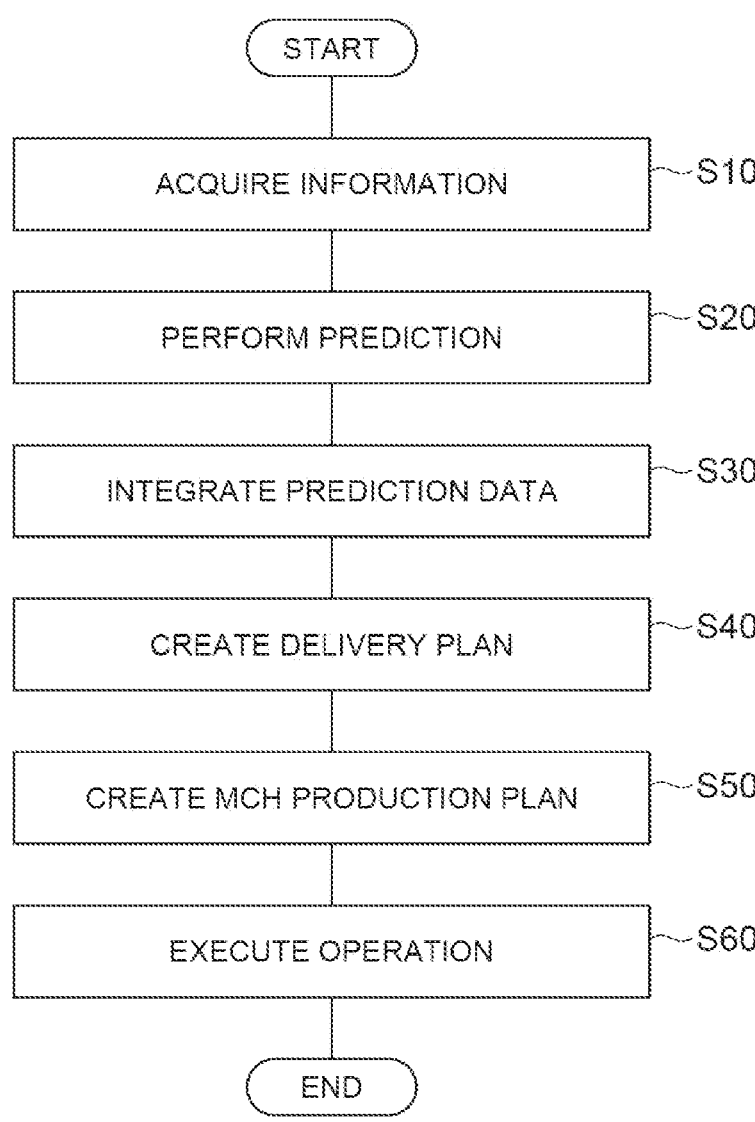
FIG. 5 is a flowchart illustrating processing contents by an operation management device of the operation management system.

Next, a management method by the operation management system 100 according to this embodiment will be described with reference to FIG. 5. FIG. 5 is a flowchart illustrating processing contents by the operation management device 101 of the operation management system 100. First, as an example of an operation management method, a method of creating a delivery plan from hydrogen demand prediction will be described.

First, the information acquisition unit 121 of the operation management device 101 acquires the MCH production base information of the MCH production base 30 and the hydrogen station information of the plurality of hydrogen stations 10 from the data server 102 (step S10). Next, the prediction unit 122 predicts timing at which supply of MCH to each of the hydrogen stations 10 becomes necessary and timing at which recovery of toluene from the hydrogen station 10 becomes necessary on the basis of the hydrogen station information and the MCH production base information (step S20).

Specifically, the prediction unit 122 creates hydrogen demand prediction in each of the hydrogen stations 10 on the basis of a transition in the amount of hydrogen filled into a vehicle in the hydrogen station 10 for a predetermined time range. Note that, it is preferable that the predetermined time range is a duration for which a certain amount of information capable of creating the prediction is included. In addition, it is preferable that the predetermined time range is not excessively long so as to secure a real-time property. As the predetermined time range, for example, the most recent one week may be set. In addition, as the predetermined time range, a range of several days to several weeks may be set. Note that, the prediction unit 122 may also consider, for example, a demand for hydrogen in the same season in the past as data that is used in the hydrogen demand prediction in a case where the demand for hydrogen fluctuates in accordance with a season without limitation to the closest time range.

In addition, the prediction unit 122 obtains a dehydrogenation conversion rate and a hydrogen recovery rate from the amount of hydrogen produced, the amount of MCH that is supplied, and the amount of toluene that is recovered in each of the hydrogen stations 10, and calculates a coefficient (factor) representing a relationship between the amount of MCH that is supplied and the amount of hydrogen that is produced. Note that, since the factor varies due to deterioration of a catalyst, or the like, the prediction unit 122 updates the factor each time in consideration of the variation. The prediction unit 122 creates prediction data of the amount of MCH that is consumed and the amount of toluene that is recovered for one week on the basis of the hydrogen demand prediction in each of the hydrogen stations 10 and the factor. The prediction data for one week is prediction data capable of grasping timing at which supply of MCH is necessary, and timing at which recovery of toluene is necessary for one week. Note that, with regard to the prediction data, another time range may be set without limitation to one week. In this case, the prediction unit 122 creates prediction data having a length corresponding to the time range.

The prediction unit 122 integrates the prediction data that is created with respect to each of the hydrogen stations 10 in step S20 (step S30). For example, for one week, many hydrogen stations 10 may require supply of MCH in a certain day, or a few hydrogen stations 10 may require supply of MC in a certain day. Accordingly, the prediction unit 122 can create the prediction data capable of grasping timing at which supply of MCH becomes necessary and timing at which recovery of toluene becomes necessary for one week by collectively considering a situation of the plurality of hydrogen stations 10 within the hydrogen supply chain 1 by integrating the prediction data.

The delivery plan creation unit 123 creates the delivery plan for delivering MCH to the plurality of hydrogen stations 10 on the basis of the prediction data integrated in step S30 (step S40). The delivery plan creation unit 123 creates an efficient delivery plan by collectively considering timing at which supply of MCH becomes necessary in each of the hydrogen stations 10 and position information of the hydrogen station 10. For example, with respect to a distant hydrogen station 10, MCH cannot be delivered immediately, and thus the moving body TR is caused to depart ahead of timing at which MCH becomes deficient. In addition, when the moving body TR is frequently sent to the distant hydrogen station 10, the transportation cost increases. Therefore, the delivery plan is created so that the frequency of delivery is reduced as much as possible. On the other hand, a near hydrogen station 10 can be supplied with MCH immediately even in a case where MCH becomes deficient. Accordingly, for example, MCH may be supplied to the near hydrogen station 10 in the middle of delivery to the distant hydrogen station 10, or the like. In addition, when MCH is supplied to the hydrogen station 10 and thus a tank becomes empty, the moving body TR accommodates toluene in the empty tank and transports toluene to the MCH production base 30. The delivery plan creation unit 123 may create the delivery plan in consideration of recovery of toluene. For example, when the moving body TR delivers MCH to a predetermined hydrogen station 10, toluene in the hydrogen station 10 may be recovered as is. In addition, the moving body TR may stop at another hydrogen station 10 to recover toluene in the middle of going back after delivering MCH to a certain hydrogen station 10. As described above, recovery of toluene is performed efficiently.

The MCH production plan creation unit 124 creates the MCH production plan in the MCH production base 30 (step S50). The MCH production plan creation unit 124 creates the MCH production plan on the basis of the prediction data integrated in step S30 and the delivery plan created in step S40. Next, the operation management device 101 transmits the delivery plan and the MCH production plan which are created to the MCH production base 30, and executes operation based on the plans (step S60).

Note that, after executing operation, the operation management device 101 monitors each of the hydrogen stations 10 within the hydrogen supply chain 1, and corrects the delivery plan and the MCH production plan by the correction unit 126 as necessary. For example, a threshold value may be set to a residual amount in the MCH tank 12 and the toluene tank 13 of the hydrogen station 10, and an alarm may be issued when reaching the threshold value. A margin may be provided for the threshold value. For example, when the residual amount of MCH inside the MCH tank 12 in the hydrogen station 10 decreases up to 30%, and MCH needs to be replenished, the operation management device 101 sets the threshold value for the residual amount in the MCH tank 12 to 50%. In addition, when the residual amount of toluene inside the toluene tank 13 in the hydrogen station 10 increases up to 70%, and toluene needs to be recovered, the operation management device 101 sets the threshold value for the residual amount in the toluene tank 13 to 50%. The operation management device 101 receives an alarm from the hydrogen station 10, and when the degree of decrease of MCH or the degree of increase of toluene is faster in comparison to prediction, the operation management device 101 corrects the delivery plan and the MCH production plan by the correction unit 126.

Next, description will be given of a method of creating the delivery plan on the basis of the residual amount in the MCH tank 12 and the toluene tank 13 as another example of the operation management method. Note that, description of the contents of the same concept as in the method of creating the delivery plan from the above-described hydrogen demand prediction will be omitted.

First, in step S10, the information acquisition unit 121 of the operation management device 101 acquires residual amount data of the MCH tank 12 and the toluene tank 13 in each of the hydrogen stations 10 within the hydrogen supply chain 1 at all times through the data server 102. Note that, "residual amount data is acquired at all times" represents a state in which the residual amount data can be grasped substantially in real time from the viewpoint of operation of MCH. Not only in a state in which the residual amount data is acquired in time intervals such as once every few seconds or once every several minutes but also in a state in which the residual amount data is acquired in time intervals such as once a day or one every few hours, the operation management device 101 acquires the residual amount data at time intervals allowing a time lag within a range having substantially no influence. Accordingly, it is assumed that any of the states corresponds to "acquired at all times". Of course, the operation management device 101 may obtain the residual amount data with the highest frequency within a range permitted by a communication speed of the network NW.

Figure 6:
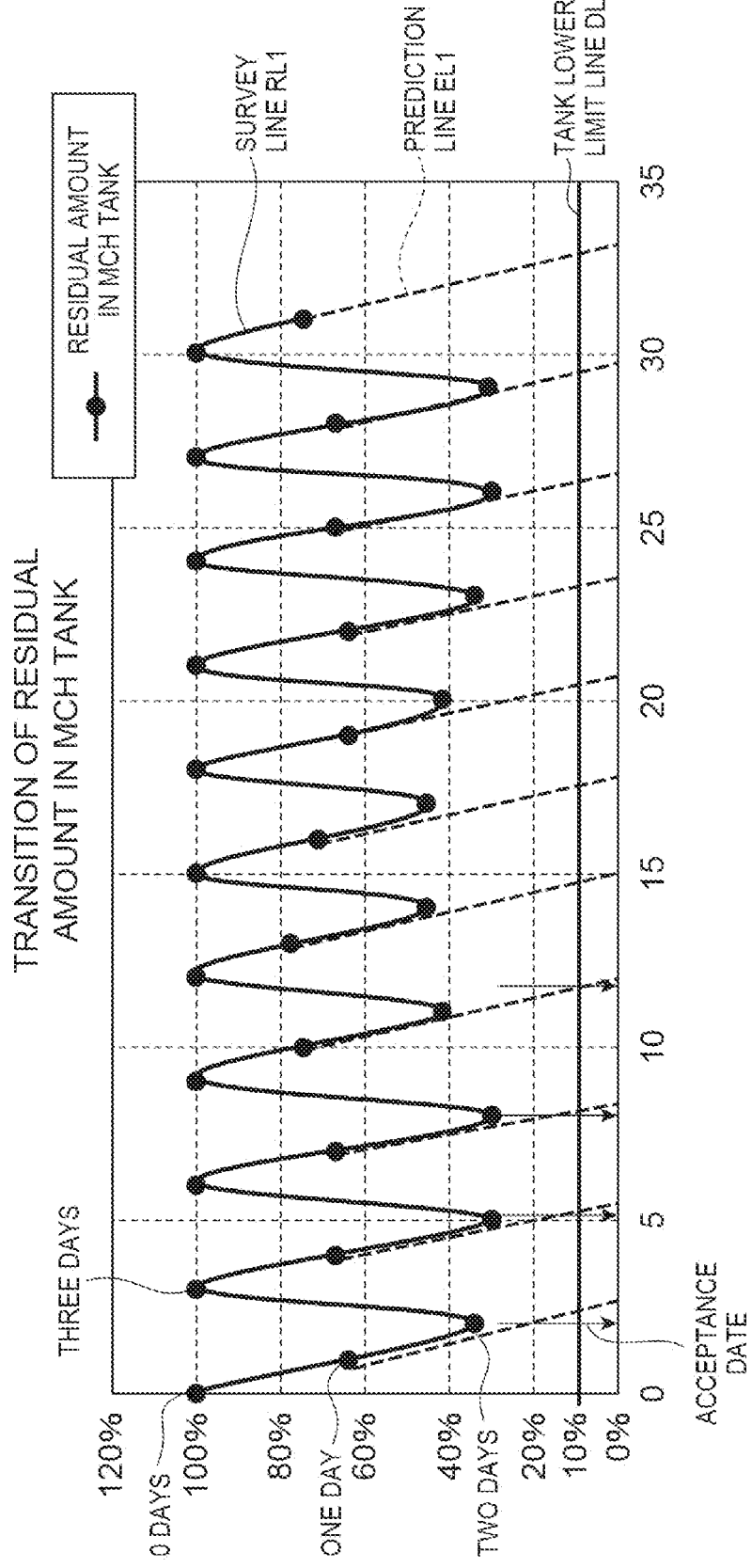
FIG. 6 is a graph illustrating a residual amount transition in an MCH tank in the hydrogen station.
Figure 7:
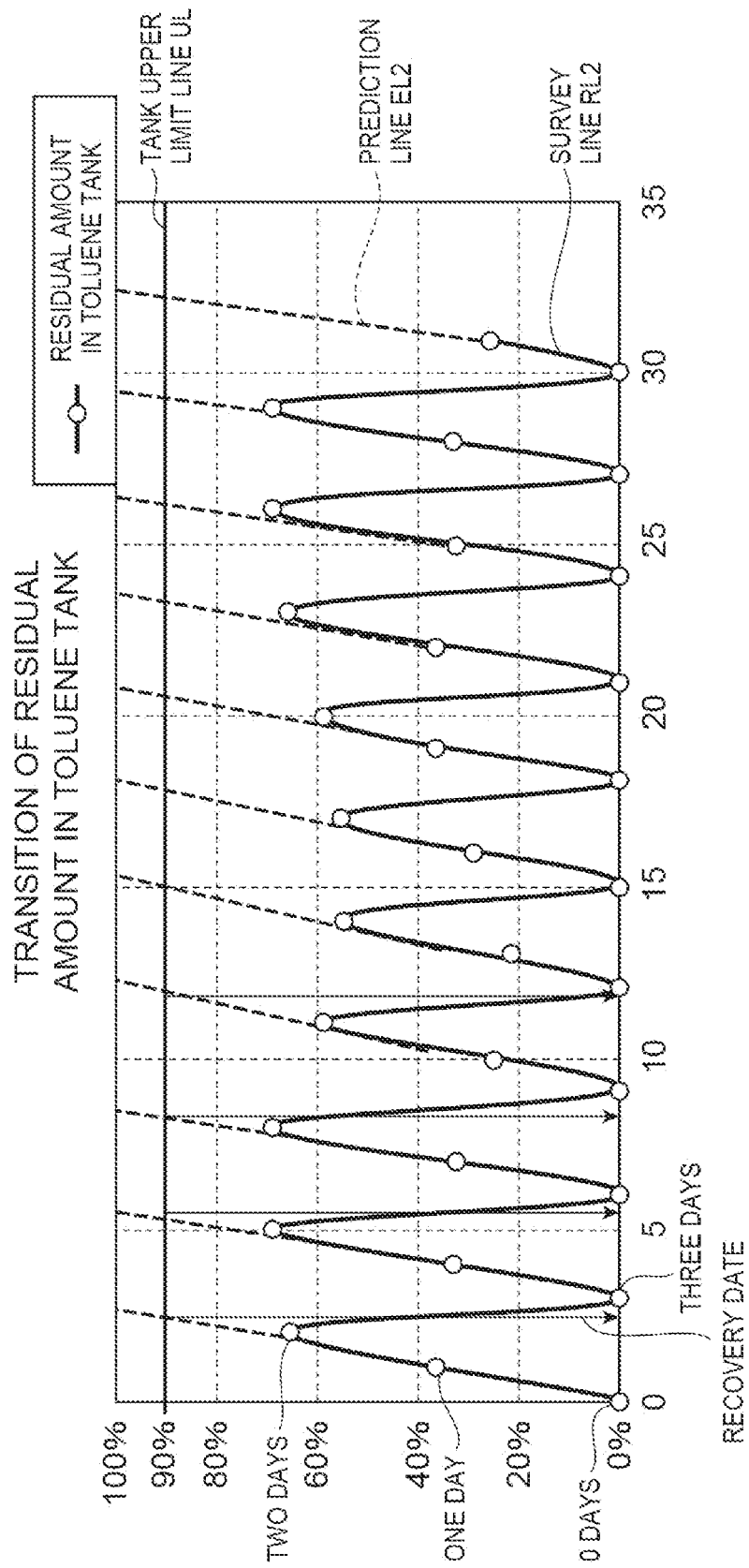
FIG. 7 is a graph illustrating a residual amount transition in a toluene tank in the hydrogen station.

In step S20, the prediction unit 122 creates transition prediction of a residual amount in the MCH tank 12 and the toluene tank 13 in the hydrogen station 10 on the basis of the residual amount data acquired in step S10 (for example, refer to a survey line RL1 in FIG. 6 and a survey line RL2 in FIG. 7). Here, the prediction unit 122 sets a threshold value for the residual amount in the MCH tank 12 and the toluene tank 13. For example, the prediction unit 122 sets the threshold value so that MCH needs to be accepted before the residual amount in the MCH tank 12 reaches the threshold value (for example, 10%) or less. That is, the threshold value for the residual amount in the MCH tank 12 is set to 10%. In addition, the prediction unit 122 sets the threshold value so that toluene needs to be recovered before the residual amount in the toluene tank 13 reaches the threshold value (for example, 90%) or greater. That is, the threshold value for the residual amount in the toluene tank 13 is set to 90%. Then, the prediction unit 122 predicts a schedule in which the residual amount in the MCH tank 12 decreases until reaching the threshold value (10%), and a schedule in which the residual amount in the toluene tank 13 increases until reaching the threshold value (90%) with respect to all of the hydrogen stations 10 within the hydrogen supply chain 1.

In step S30, the prediction unit 122 integrates the prediction data of all of the hydrogen stations 10. In step S30, the delivery plan creation unit 123 creates the delivery plan for efficient delivery in consideration of position information of each of the hydrogen stations 10 on the basis of the above-described integrated prediction data. In addition, in step S40, the MCH production plan creation unit 124 creates the MCH production plan on the basis of the integrated prediction data. Note that, the delivery plan creation unit 123 and the MCH production plan creation unit 124 may create the delivery plan and the MCH production plan by using AI.

FIG. 6 is a graph illustrating a residual amount transition in the MCH tank 12 in an arbitrary hydrogen station 10. FIG. 7 is a graph illustrating a residual amount transition in the toluene tank 13 in an arbitrary hydrogen station 10. Here, it is assumed that the capacity of any of the MCH tank 12 and the toluene tank 13 is 50 m$^3$, and the moving body TR is a tank lorry having lorry capacity of 30 tons. In addition, it is assumed that the hydrogen station 10 uses approximately 18 m$^3$ of MCH per day, produces approximately 16 m$^3$ of toluene per day, and operates at a load of 100%.

As illustrated in FIG. 6, the prediction unit 122 acquires the residual amount data in the MCH tank 12 on the first day. In this case, the prediction unit 122 grasps that the residual amount transitions in a transition from "0 days" to "one day" of the survey line RL1. The prediction unit 122 sets a prediction line EL1 on the basis of the residual amount transition of the survey line RL1. According to this, the prediction unit 122 predicts a residual amount transition after "one day". The prediction unit 122 recognizes a date when the prediction line EL1 reaches a tank lower limit line DL (10%) as "acceptance date". Here, the "acceptance date" is set between "two days" and "three days". Accordingly, the delivery plan creation unit 123 creates the delivery plan so that the MCH tank 12 is replenished with MCH at any point of time between "two days" and "three days". According to this, the residual amount in the MCH tank 12 becomes "100%" at "three days". Thereafter, the operation management device 101 repeats the same process. According to this, as indicated by the survey line RL1, the transition of the residual amount in the MCH tank 12 is repeated so that the residual amount is recovered to 100% before reaching the tank lower limit line DL.

As illustrated in FIG. 7, the prediction unit 122 acquires the residual amount data in the toluene tank 13 on the first day. In this case, the prediction unit 122 grasps that the residual amount transitions in a transition from "0 days" to "one day" of the survey line RL2. The prediction unit 122 sets a prediction line EL2 on the basis of the residual amount transition of the survey line RL2. According to this, the prediction unit 122 predicts a residual amount transition after "one day". The prediction unit 122 recognizes a date when the prediction line EL2 reaches a tank upper limit line UL (90%) as "recovery date". Here, the "recovery date" is set between "two days" and "three days". Accordingly, the delivery plan creation unit 123 creates the delivery plan so that toluene is recovered from the toluene tank 13 at any point of time between "two days" and "three days". According to this, the residual amount in the toluene tank 13 becomes "0%" at three days. Thereafter, the operation management device 101 repeats the same process. According to this, as indicated by the survey line RL2, the transition of the residual amount in the toluene tank 13 is repeated so that the residual amount is recovered to 0% before reaching the tank upper limit line UL.

next, an operation and an effect of the operation management system 100 according to this embodiment will be described.

In the operation management system 100, the information acquisition unit 121 acquires the hydrogen station information on the dehydrogenation status in the plurality of hydrogen stations 10. Since the hydrogen station information is information capable of grasping that each of the hydrogen stations 10 is in which dehydrogenation status, the hydrogen station information is information capable of grasping that MCH should be delivered to which hydrogen station 10 at which timing. The delivery plan creation unit 123 creates the delivery plan for delivering MCH to the plurality of hydrogen stations 10 on the basis of at least the hydrogen station information. Accordingly, the delivery plan creation unit 123 can create an appropriate delivery plan after collectively determining the dehydrogenation status of each of the hydrogen stations 10. As described above, it is possible to efficiently deliver MCH from the MCH production base 30 to the plurality of hydrogen stations 10.

The information acquisition unit 121 may acquire the MCH production base information on an MCH production status in the MCH production base 30. The delivery plan creation unit 123 may create the delivery plan on the basis of the hydrogen station information and the MCH production base information. In this case, the delivery plan creation unit 123 can create the delivery plan after also considering the MCH production status in the MCH production base 30. For example, when a plurality of the moving bodies TR simultaneously perform shipment, production in the MCH production base 30 may be delayed. In this case, the delivery plan creation unit 123 can create the delivery plan such as shipment by the moving bodies TR with time intervals.

The hydrogen station information may include raw material information on the amount of MCH that is used in the hydrogen stations 10, and dehydrogenation product information on the amount of toluene generated in accordance with a dehydrogenation reaction. In this case, the delivery plan creation unit 123 can create the delivery plan after also considering the amount of toluene generated in each of the hydrogen stations 10.

The operation management system 100 further includes the prediction unit 122 that predicts timing at which supply of MCH to the hydrogen station 10 becomes necessary on the basis of at least the hydrogen station information. The delivery plan creation unit 123 may create the delivery plan on the basis of a prediction result obtained by the prediction unit 122. In this case, the delivery plan creation unit 123 can create the delivery plan in advance before the timing at which supply of MCH becomes actually necessary in the hydrogen station 10. For example, in the example illustrated in FIG. 6, it is assumed that the moving body TR initiates shipment at timing at which the survey line RL1 approaches the tank lower limit line DL. In this case, in a distant hydrogen station 10, or the like, replenishment of MCH to the MCH tank 12 may be excessively delayed due to a time lag up to arrival, and the survey line RL1 may be lowered than the tank lower limit line DL. In contrast, when the prediction unit 122 performs prediction by using the prediction line EL1, replenishment of MCH can be performed before the survey line RL1 is lowered than the tank lower limit line DL.

The prediction unit 122 may predict timing at which supply of MCH to the hydrogen station 10 becomes necessary on the basis of a demand for hydrogen in the hydrogen station 10. In this case, the prediction unit 122 can perform long-term (for example, one week) prediction on the basis of a transition in a demand for hydrogen, or the like.

The prediction unit 122 may predict timing at which supply of MCH to the hydrogen station 10 becomes necessary on the basis of a residual amount of MCH in the hydrogen station 10. In this case, the prediction unit 122 can perform prediction based on an actual situation on the basis of an actual residual amount of MCH in the hydrogen station.

The present disclosure is not limited to the above-described embodiment.

For example, in the above-described embodiment, the operation management system 100 is provided with the prediction unit 122, but the prediction unit 122 may be omitted. In this case, the delivery plan creation unit 123 may create the delivery plan on the basis of only survey data. For example, the operation management system 100 sets a threshold value for the MCH tank 12 and the toluene tank 13 in each of the hydrogen stations 10. The delivery plan creation unit 123 grasps a hydrogen station 10 for which an alarm is issued on the basis of the threshold value. In addition, the delivery plan creation unit 123 creates the delivery plan by considering position information of the hydrogen station 10.

In addition, in the above-described embodiment, the operation management system 100 creates the delivery plan by considering both the MCH residual amount data and the toluene residual amount data, but only the MCH residual amount data may be considered. For example, the operation management system 100 may create the delivery plan with efficiency with respect to delivery of MCH, and recovery of toluene may be performed in accordance with a constant rule.

In addition, the delivery plan creation unit 123 of the operation management system 100 creates the delivery plan by also considering the MCH production base information in addition to the hydrogen station information, but the MCH production base information may not be considered. For example, in a case where the amount of production in the MCH production base 30 is large in comparison to the number of the moving body TR that can be used for delivery to a certain area, and thus the residual amount of MCH in the MCH production base substantially may not be considered, the delivery plan creation unit 123 may not consider the MCH production base information.

REFERENCE SIGNS LIST

10: hydrogen station (dehydrogenation base), 30: MCH production base (raw material production base), 100: operation management system, 121: information acquisition unit, 122: prediction unit, 123: delivery plan creation unit.

The invention claimed is:

1. An operation management system configured to manage delivery of a raw material from a raw material production base, where the raw material including a hydride is produced to a plurality of dehydrogenation bases, and where the raw material is subjected to a dehydrogenation reaction to obtain a hydrogen-containing gas, the operation management system comprising:

an information acquisition unit configured to acquire first information on a dehydrogenation status in the plurality of dehydrogenation bases, and second information on a production status of the raw material in the raw material production base;

a delivery plan creation unit configured to create a delivery plan for delivering the raw material to the plurality of dehydrogenation bases and returning and reusing dehydrogenated product generated to the raw material production base at least on the basis of the first information and the second information; and a transmitter configured to transmit the delivery plan to the raw material production base to adjust the production of the raw material, to instruct workers, via a display, of the delivery plan, and to deploy at least a tank lorry to at least one of the plurality of dehydrogenation bases based on the delivery plan, wherein the information acquisition unit is further configured to:

acquire the first information on the dehydrogenation status in the plurality of dehydrogenation bases from a plurality of controllers, each controller provided at each of the plurality of dehydrogenation bases; and predict timings at which to supply the raw material to each of the plurality of dehydrogenation bases on a basis of a comparison between the first information and predetermined thresholds, the second information, and position information of each of the plurality of dehydrogenation bases, and wherein the first information is information from each of the controllers on at least a residual amount of the raw material used in the plurality of dehydrogenation bases, consumption of the raw material in a dehydrogenation device at each of the plurality of dehydrogenation bases, and an amount of the dehydrogenation product generated that can be recovered by the tank lorry and reused, wherein the residual amount of the raw material used in the plurality of dehydrogenation bases is determined by a liquid level meter, the consumption of the raw material in the dehydrogenation device at each of the plurality of dehydrogenation bases is determined by pressure meters positioned at least at a high-pressure accumulator and an intermediate-pressure accumulator, and the amount of the dehydrogenation product generated at the plurality of dehydrogenation bases is determined by a separate liquid level meter, wherein the timings are predicted and updated by acquiring the first information for a predetermined time period, and determining at least the amount of raw material consumed in the dehydrogenation device at each of the plurality of dehydrogenation bases and the amount of dehydrogenation product generated during the predetermined time period, wherein the predetermined thresholds are updated on a basis of a continuous monitoring of the amount of raw material consumed in the dehydrogenation device at each of the plurality of dehydrogenation bases and the amount of dehydrogenation product generated at each of the plurality of dehydrogenation bases, and wherein the production of the raw material is adjusted based on at least a determination of a residual amount of raw material at the raw material production base in combination with a signal from the controller at the at least one of the dehydrogenation bases indicating the amount of dehydrogenated product generated and subsequently supplied into the tank lorry for return and reuse.

2. The operation management system according to claim 1, further comprising:

a prediction unit configured to predict the timing at which supply of the raw material to the dehydrogenation bases becomes necessary at least on the basis of the first information, wherein the delivery plan creation unit creates the delivery plan on the basis of a prediction result obtained by the prediction unit.

3. The operation management system according to claim 2, wherein the prediction unit calculates a factor between a supply amount of the raw material and a production amount of the hydrogen gas at the dehydrogenation bases, and predicts the timing at which the supply of the raw material to the dehydrogenation bases becomes necessary on the basis of the factor.

4. The operation management system according to claim 3, wherein the prediction unit predicts the timing at which the supply of the raw material to the dehydrogenation bases becomes necessary, on the basis of the factor and deterioration status of a catalyst in a dehydrogenation apparatus at the dehydrogenation bases.

5. The operation management system according to claim 1, wherein the second information includes supply amount data of the dehydrogenation product recovered from dehydrogenation bases to the raw material production base.

6. The operation management system according to claim 1, wherein the second information includes one or more pieces of information selected from the group consisting of the residual amount or shipment amount of substance before dehydrogenation of the hydride generated by the dehydrogenation reaction, and the residual amount or shipment amount of substance after the dehydrogenation reaction.

7. An operation management device, comprising:

at least a server, configured to:

acquire first information on a dehydrogenation status in a plurality of dehydrogenation bases, and second information on a production status of raw material in a raw material production base, where the raw material including a hydride is produced to the plurality of dehydrogenation bases, and where the raw material is subjected to a dehydrogenation reaction to obtain a hydrogen-containing gas;

create a delivery plan for delivering the raw material to the plurality of dehydrogenation bases and returning and reusing dehydrogenated product generated to the raw material production base at least on the basis of the first information and the second information; and transmit the delivery plan to the raw material production base to adjust the production of the raw material, to instruct workers, via a display, of the delivery plan, and to deploy at least a tank lorry to at least one of the plurality of dehydrogenation bases based on the delivery plan, wherein the server is further configured to:

acquire the first information on the dehydrogenation status in the plurality of dehydrogenation bases from a plurality of controllers, each controller provided at each of the plurality of dehydrogenation bases; and predict timings at which to supply the raw material to each of the plurality of dehydrogenation bases on a basis of at least a comparison between the first information and predetermined thresholds, the second information, and position information of each of the plurality of dehydrogenation bases, and wherein the first information is information from each of the controllers on at least a residual amount of the raw material used in the plurality of dehydrogenation bases, consumption of the raw material in a dehydrogenation device at each of the plurality of dehydrogenation bases, and an amount of the dehydrogenation product generated that can be recovered by the tank lorry and reused, wherein the residual amount of the raw material used in the plurality of dehydrogenation bases is determined by a liquid level meter, the consumption of the raw material in the dehydrogenation device at each of the plurality of dehydrogenation bases is determined by pressure meters positioned at least at a high-pressure accumulator and an intermediate-pressure accumulator, and the amount of the dehydrogenation product generated at the plurality of dehydrogenation bases is determined by a separate liquid level meter, wherein the timings are predicted and updated by acquiring the first information for a predetermined time period, and determining at least the amount of raw material consumed in the dehydrogenation device at each of the plurality of dehydrogenation bases and the amount of dehydrogenation product generated during the predetermined time period, wherein the predetermined thresholds are updated on a basis of a continuous monitoring of the amount of raw material consumed in the dehydrogenation device at each of the plurality of dehydrogenation bases and the amount of dehydrogenation product generated at each of the plurality of dehydrogenation bases, and wherein the production of the raw material is adjusted based on at least a determination of a residual amount of raw material at the raw material production base in combination with a signal from the controller at the at least one of the dehydrogenation bases indicating the amount of dehydrogenated product generated and subsequently supplied into the tank lorry for return and reuse.

8. A method for managing delivery of a raw material from a raw material production base, where the raw material including a hydride is produced to a plurality of dehydrogenation bases, and where the raw material is subjected to a dehydrogenation reaction to obtain a hydrogen-containing gas, the method comprising:

acquiring first information on a dehydrogenation status in the plurality of dehydrogenation bases, and second information on a production status of the raw material in the raw material production base;

creating a delivery plan for delivering the raw material to the plurality of dehydrogenation bases and returning and reusing dehydrogenated product generated to the raw material production base at least on the basis of the first information and the second information; and transmitting the delivery plan to the raw material production base to adjust the production of the raw material, to instruct workers, via a display, of the delivery plan, and to deploy at least a tank lorry to at least one of the plurality of dehydrogenation bases based on the delivery plan, wherein the first information on the dehydrogenation status in the plurality of dehydrogenation bases is acquired from a plurality of controllers, each controller provided at each of the plurality of dehydrogenation bases, wherein timings are predicted at which to supply the raw material to each of the plurality of dehydrogenation bases on a basis of at least a comparison between the first information and predetermined thresholds, the second information, and position information of each of the plurality of dehydrogenation bases, and wherein the first information is information from each of the controllers on at least a residual amount of the raw material used in the plurality of dehydrogenation bases, consumption of the raw material in a dehydrogenation device at each of the plurality of dehydrogenation bases, and an amount of the dehydrogenation product generated that can be recovered by the tank lorry and reused, wherein the residual amount of the raw material used in the plurality of dehydrogenation bases is determined by a liquid level meter, the consumption of the raw material in the dehydrogenation device at each of the plurality of dehydrogenation bases is determined by pressure meters positioned at least at a high-pressure accumulator and an intermediate-pressure accumulator, and the amount of the dehydrogenation product generated at the plurality of dehydrogenation bases is determined by a separate liquid level meter, wherein the timings are predicted and updated by acquiring the first information for a predetermined time period, and determining at least the amount of raw material consumed in the dehydrogenation device at each of the plurality of dehydrogenation bases and the amount of dehydrogenation product generated during the predetermined time period, wherein the predetermined thresholds are updated on a basis of a continuous monitoring of the amount of raw material consumed in the dehydrogenation device at each of the plurality of dehydrogenation bases and the amount of dehydrogenation product generated at each of the plurality of dehydrogenation bases, and wherein the production of the raw material is adjusted based on at least a determination of a residual amount of raw material at the raw material production base in combination with a signal from the controller at the at least one of the dehydrogenation bases indicating the amount of dehydrogenated product generated and subsequently supplied into the tank lorry for return and reuse.

\*  \*  \*  \*  \*